US012152753B2

(12) United States Patent
Chen et al.

(10) Patent No.: US 12,152,753 B2
(45) Date of Patent: Nov. 26, 2024

(54) LAMP

(71) Applicant: OSRAM GmbH, Munich (DE)

(72) Inventors: Guofeng Chen, Foshan (CN); Shijie He, Foshan (CN); Liqin Li, Foshan (CN)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 18/552,731

(22) PCT Filed: Feb. 11, 2022

(86) PCT No.: PCT/EP2022/053390

§ 371 (c)(1),
(2) Date: Sep. 27, 2023

(87) PCT Pub. No.: WO2022/207173

PCT Pub. Date: Oct. 6, 2022

(65) Prior Publication Data

US 2024/0151384 A1 May 9, 2024

(30) Foreign Application Priority Data

Mar. 29, 2021 (CN) ......................... 202120630823.8

(51) Int. Cl.
*F21S 45/48* (2018.01)
*F21S 41/19* (2018.01)
(Continued)

(52) U.S. Cl.
CPC ............ *F21S 45/48* (2018.01); *F21S 41/192* (2018.01); *F21S 43/195* (2018.01);
(Continued)

(58) Field of Classification Search
CPC .......... F21S 45/48; F21S 43/195; F21S 41/19; F21S 41/195; F21S 41/192; F21S 43/192;
(Continued)

(56) References Cited

U.S. PATENT DOCUMENTS

D690,053 S 9/2013 Zhang et al.
10,563,833 B2 2/2020 Feil et al.
(Continued)

FOREIGN PATENT DOCUMENTS

CN 111853692 A * 10/2020
CN 111853694 A * 10/2020
(Continued)

*Primary Examiner* — Erin Kryukova
(74) *Attorney, Agent, or Firm* — Slater Matsil, LLP

(57) ABSTRACT

In an embodiment a lamp includes a light source having a light source circuit board and a light emitting element arranged on the light source circuit board, a driver configured to drive the light source and having a driving circuit board and a driving electronic element arranged on the driving circuit board, a connector connectable to a power source, wherein the driver is connected to the connector such as to be spatially separated from the light source and a heat sink inside which the light source and the connector are fixedly attached in such a manner that the light source and the driver are radially surrounded by the heat sink, wherein the connector includes a supporting column configured to support the driving circuit board and a retainer configured to hold the driving circuit board.

12 Claims, 9 Drawing Sheets

(51) Int. Cl.

| | |
|---|---|
| ***F21S 43/19*** | (2018.01) |
| ***F21V 23/00*** | (2015.01) |
| ***F21V 23/06*** | (2006.01) |
| ***F21V 29/77*** | (2015.01) |

(52) U.S. Cl.
CPC ............ *F21V 23/006* (2013.01); *F21V 23/06* (2013.01); *F21V 29/773* (2015.01)

(58) Field of Classification Search
CPC ...... F21S 43/19; F21V 29/773; F21V 23/006; F21V 23/06
See application file for complete search history.

(56) References Cited

U.S. PATENT DOCUMENTS

| | | | | |
|---|---|---|---|---|
| 2009/0071624 | A1 | 3/2009 | Zhang et al. | |
| 2010/0073884 | A1 | 3/2010 | Peloza | |
| 2013/0257278 | A1 | 10/2013 | DeVore et al. | |
| 2014/0334162 | A1 | 11/2014 | Kwon et al. | |
| 2014/0369056 | A1 | 12/2014 | Kwon | |
| 2018/0051858 | A1* | 2/2018 | Hatanaka | F21S 45/47 |
| 2019/0063706 | A1* | 2/2019 | Feil | F21S 43/27 |
| 2019/0257489 | A1* | 8/2019 | Ano | F21S 41/192 |
| 2019/0267355 | A1* | 8/2019 | Ueno | F21S 41/192 |
| 2019/0368676 | A1* | 12/2019 | Lee | F21S 43/195 |

FOREIGN PATENT DOCUMENTS

| | | | | |
|---|---|---|---|---|
| CN | 212085399 | U | * | 12/2020 |
| JP | 2018067451 | A | * | 4/2018 |
| KR | 20160028081 | A | | 3/2016 |
| KR | 20180081988 | A | * | 7/2018 |

* cited by examiner

LAMP

CROSS-REFERENCE TO RELATED APPLICATIONS

This patent application is a national phase filing under section 371 of PCT/EP2022/053390, filed Feb. 11, 2022, which claims the priority of German patent application 202120630823.8, filed Mar. 29, 2021, each of which is incorporated herein by reference in its entirety.

TECHNICAL FIELD

The present disclosure relates to a lamp and, in particular, to a lamp for a vehicle, for example, a headlight or a taillight.

BACKGROUND

This section provides background information related to the present disclosure, which may not necessarily constitute the prior art.

A lamp is known, including a light-emitting diode (LED) serving as a light source and a driver for driving the light source. The LED and driver are arranged on a printed circuit board (PCB). The lamp usually has a small size. Luminous efficiency of the LED decreases with increase of temperature, so heat dissipation is a key technical difficulty of the lamp. To this end, the lamp further includes a heat sink for dissipating heat generated from the LED and/or the driver.

In some LED lamps, the LED and the driver are arranged on the same printed circuit board and are attached to the heat sink. For these LED lamps, the driver is close to the LED, that is, heat is concentrated. Therefore, power and luminous flux of these lamps are limited due to poor heat dissipation.

There are known lamps disclosed in the following references: U.S. Pat. No. 10,563,833 B2, US 2010/0073884 A1, U.S. D690,053 S, etc.

SUMMARY

Embodiments provide a lamp having good heat dissipation to increase power and luminous flux and having a compact structure to reduce space of installation.

According to an embodiment of the present disclosure, there is provided a lamp including a light source, a driver, a connector and a heat sink. The light source includes a light source circuit board and a light emitting element arranged on the light source circuit board. The driver is configured to drive the light source and includes a driving circuit board and a driving electronic element arranged on the driving circuit board. The connector is adapted to be connected to a power source, and the driver is connected to the connector such as to be spatially separated from the light source. The light source and the connector are fixedly attached inside the heat sink, so that the light source and the driver are radially surrounded by the heat sink. The connector includes a supporting column for supporting the driving circuit board, and a retainer for holding the driving circuit board. The lamp according to the present disclosure can not only improve the heat dissipation so as to meet power demand, but also has a compact structure to reduce space of installation.

The lamp according to the present disclosure has two circuit boards dedicated to the light source and the driver and spatially separated from each other, and both the light source and the driver are attached inside the heat sink, such that heat generated from the light source and heat generated from the driver are separated from each other rather than concentrated, thereby facilitating heat dissipation. Since the heat management of the lamp is optimized, that is, the heat is easily dissipated, the power and luminous flux of the lamp can be increased. In addition, the lamp according to the present disclosure has the light source, the driver and the connector that are integrated inside the heat sink, and therefore has a compact structure, requiring only a small space for installation. In this way, it is possible to have additional space for arranging components such as a fan, thereby further improving the heat dissipation and increasing the power and the luminous flux.

In some examples, an internal driver and a heat sink with a special structure are adopted to achieve better heat dissipation, thereby having better photoelectric performance.

In some examples, the driver is located between the connector and the light source.

In some examples, the heat sink includes a base and a heat dissipation structure extending from the base in an axial direction. The base includes a supporter to which the light source is attached. The light source and the driver are arranged on opposite sides of the supporter in the axial direction. The heat sink with such a structure facilitates conduction and dissipation of heat.

In some examples, the supporter is provided with at least one through hole via which the driver is electrically connected to the light source. Such a structure facilitates assembling.

In some examples, the light source is attached to the supporter by thermally conductive glue. The supporter is provided with an aperture via which thermally conductive glue is filled between the supporter and the connector. The thermally conductive glue promotes heat generated by the light source and heat generated by the driver to be conducted to the heat sink, thereby improving heat dissipation.

In some examples, the connector is fixedly attached to the heat sink by a sealant.

In some examples, the retainer is provided with a hook for retaining the driving circuit board. The retainer has a simple structure and low manufacturing cost.

In some examples, the connector includes a positioning member having a protrusion. The heat sink is provided with a recess for receiving the protrusion. The positioning member facilitates assembling and positioning of the connector.

In some examples, the heat dissipation structure includes: a cylindrical portion extending from the base in the axial direction, and multiple fins extending in the axial direction on an outer circumferential surface of the cylindrical portion and evenly distributed in a circumferential direction of the cylindrical portion.

In some examples, the cylindrical portion of the heat sink is provided with an opening. A fin at each side of the opening has an “F”-shaped cross-section. The other fins than the fin at each side of the opening each have a cross-section with a shape in which two “F”s are connected back to back to each other. The heat sink with such a structure has a large area of heat fins and has opening that facilitates flow of surrounding air, so that the heat dissipation can be significantly improved.

In some examples, the base and the heat dissipation structure of the heat sink are formed into one piece. This structure facilitates heat conduction.

In some examples, the lamp is a headlight or a taillight for a vehicle. The lamp according to the present disclosure has a compact structure, and therefore is particularly suitable for an apparatus having a small space of installation, for example, the vehicle. In addition, as described above, due to the increased power and luminous flux, the lamp according to the present disclosure may have multiple LEDs so as to realize multiple functions.

From the detailed descriptions below, other application fields of the present disclosure will become more apparent. It should be understood that, although showing preferred embodiments of the present disclosure, these detailed descriptions and specific examples are intended for the purpose of illustrative description only and are not intended to limit the present disclosure.

BRIEF DESCRIPTION OF THE DRAWINGS

Features and advantages of one or more embodiments of the present disclosure will become easier to be understood through the following description with reference to the drawings in which.

DETAILED DESCRIPTION OF ILLUSTRATIVE EMBODIMENTS

Figure 1:
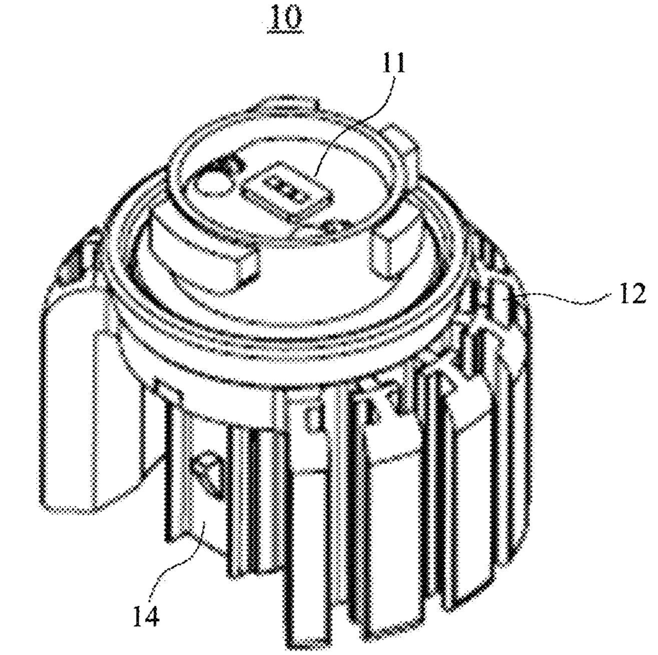
FIGS. 1 and 2 are schematic perspective views of a lamp according to an embodiment of the present disclosure viewed from different directions.
Figure 2:
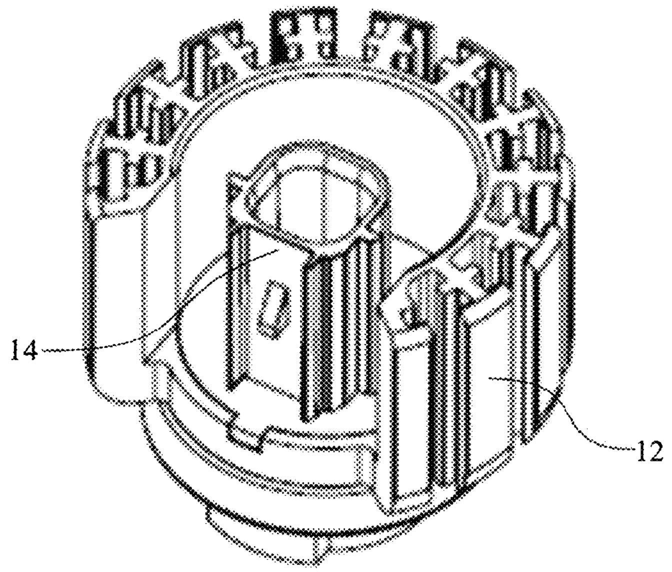

Now, exemplary embodiments will be described more fully with reference to the drawings.

Exemplary embodiments are provided so that the present disclosure can be exhaustive and can more fully convey the scope to those skilled in the art. Specific details such as examples of specific components, devices, and methods are described to provide a thorough understanding of various embodiments of the present disclosure. It will be clear to those skilled in the art that the exemplary embodiments can be implemented in various forms without specific details, and should not be construed as limiting the scope of the present disclosure. In some exemplary embodiments, well-known processes, device structures, and technologies are not described in detail.

The lamp according to the present disclosure is applicable to various occasions. In particular, the lamp according to the present disclosure is applicable to a vehicle, for example, serving as a headlight, a taillight, a fog light, a position light, a brake light, a turn signal light for a vehicle, or a suitable combination thereof. It should be understood that the lamp according to the present disclosure is not limited to the applications described herein, and may be adapted to any other suitable apparatus.

A lamp 10 according to an embodiment of the present disclosure will be described below with reference to FIGS. 1 to 5.

As shown in FIGS. 1 to 5, the lamp 10 includes a light source 11, a driver 13, a connector 14 and a heat sink 12. The light source 11 and the connector 14 are attached inside the heat sink 12. The driver 13 is connected to the connector 14 and is spatially separated from the light source 11. The driver 13 is electrically connected to the light source 11 and is configured to drive the light source 11 to emit a light beam. The connector 14 is electrically connected to the driver 13 and is configured to connect the driver 13 to a power source. The heat sink 12 is configured to transfer or dissipate heat generated from the light source 11 and the driver 13.

The light source 11 is configured to emit a light beam for illumination or signal. The light source 11 includes a light source circuit board 11*a* and a light emitting element 11*b* arranged on the light source circuit board 11*a*. According to required functions, the light source 11 may include various light emitting elements 11*b*, for example, LEDs that can emit light beams with different wavelengths or brightness. A type, the number, and arrangement of the light emitting element 11*b* may vary with actual needs. The light source circuit board 11*a* is attached to the heat sink 12 by thermally conductive glue 16 so as to transfer the heat generated by the light source 11 to the heat sink 12 via the thermally conductive glue 16. The light source circuit board 11*a* may be, for example, a printed circuit board (PCB). It should be understood that a structure or arrangement of the light source circuit board 11*a* may vary with actual needs.

The driver 13 is configured to drive the light source 11 so that the light emitting element 11*b* gives out light. The driver 13 includes a driving circuit board 13*a* and a driving electronic element 13*b* arranged on the driving circuit board 13*a*. A pin 13*c* is arranged on the driving circuit board 13*a*. The pin 13*c* is electrically connected to the light source 11. For example, the pin 13*c* is soldered to the light source circuit board 11*a*. The driving circuit board 13*a* may be, for example, a printed circuit board (PCB). It should be understood that structures or arrangement of the driving circuit board 13*a* and the driving electronic element 13*b* may vary with actual needs.

Figure 3:
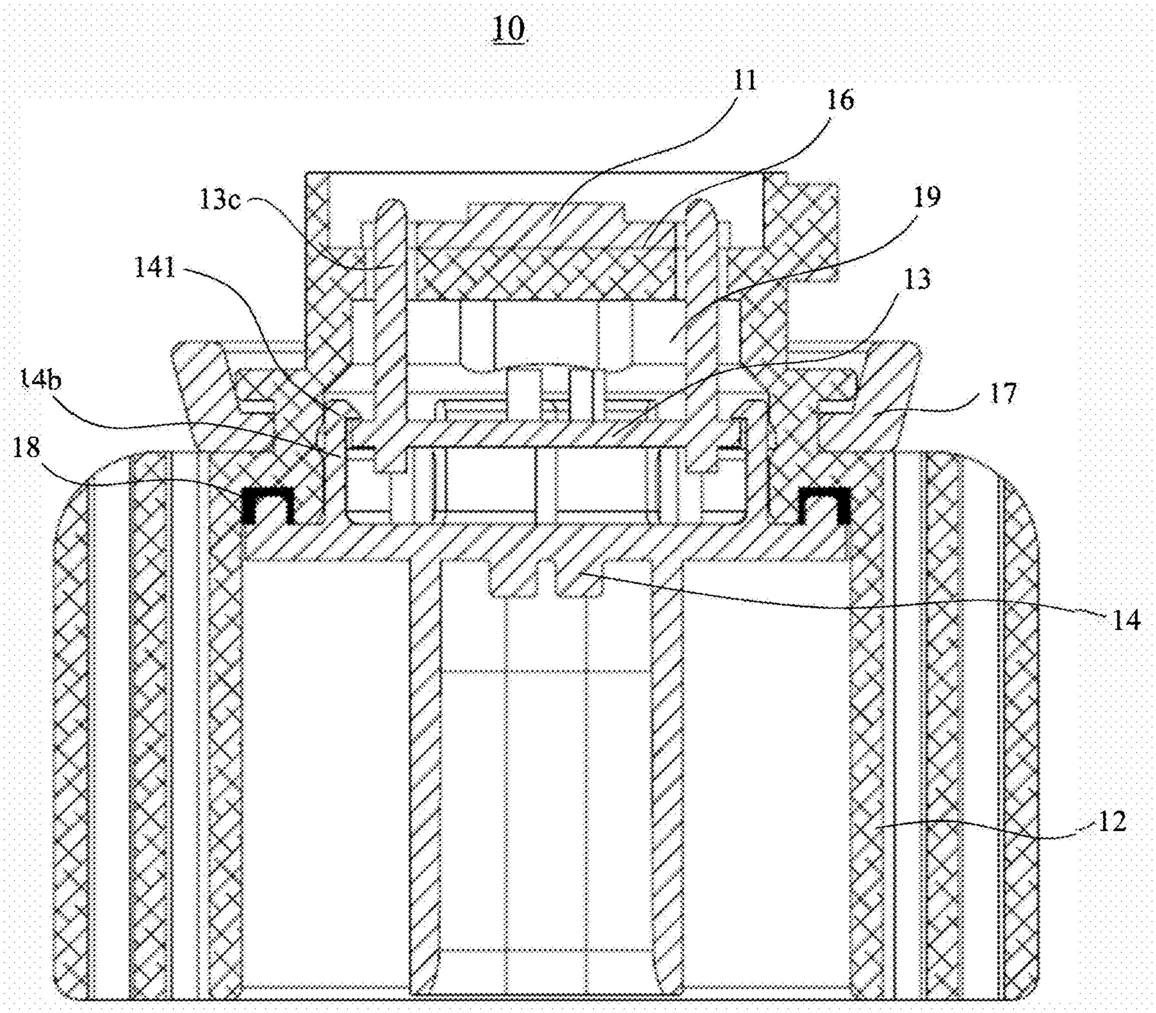
FIGS. 3 and 4 are schematic sectional views of the lamp of FIG. 1 taken along different planes.
Figure 5:
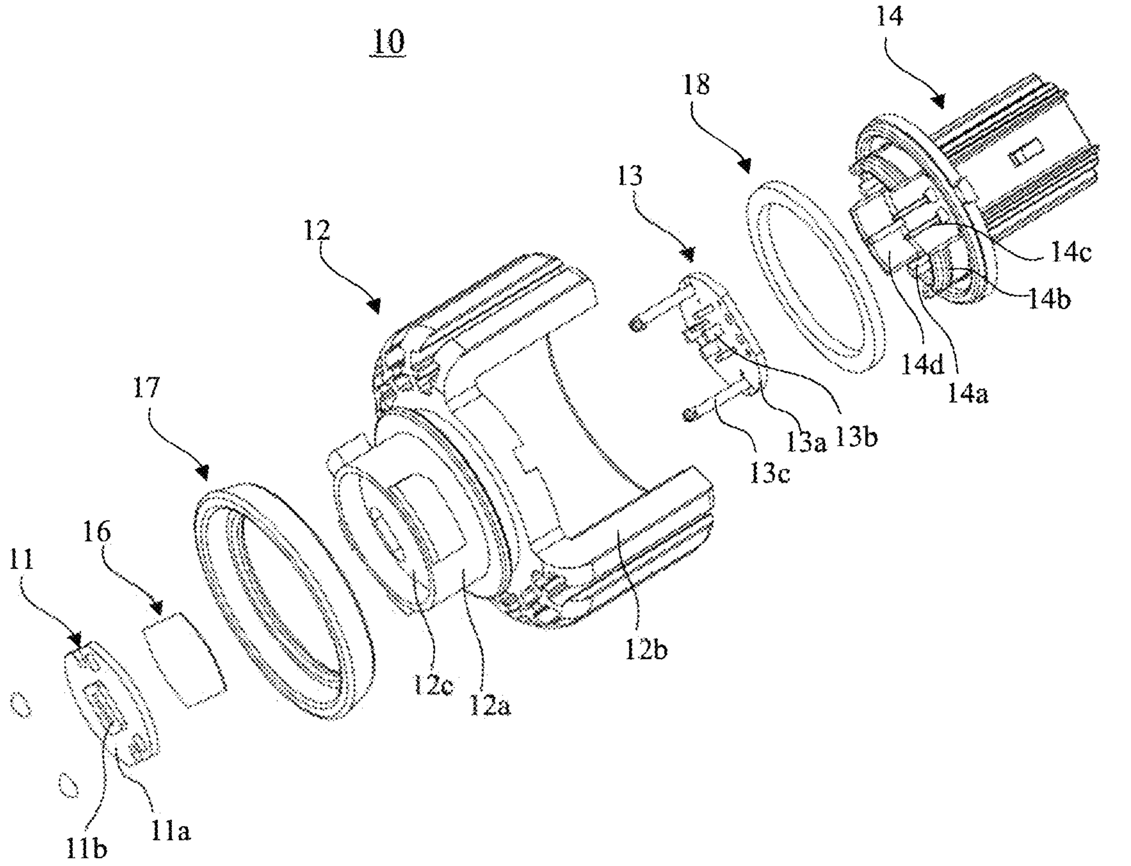
FIG. 5 is an exploded view of the lamp shown in FIG. 2.

The connector 14 is connected to an external power source for power supply. A pin 14*c* is arranged on the connector 14. The pin 14*c* is electrically connected to the driver 13. For example, the pin 14*c* is soldered to the driving circuit board 13*a*. The driver 13 is connected to or arranged on the connector 14. As shown in FIGS. 3 and 5, the connector 14 includes a supporting column 14*a* and a retainer 14*b*. The supporting column 14*a* is configured to support the driving circuit board 13*a* so that the driving circuit board 13*a* is spatially separated from the connector 14 by a certain distance. The retainer 14*b* is configured to hold the driving circuit board 13*a* on the supporting column 14*a*. In the example shown, the retainer 14*b* is provided with a hook 141, so that the driving circuit board 13*a* is sandwiched between the hook 141 and the supporting column 14*a*.

Figure 4:
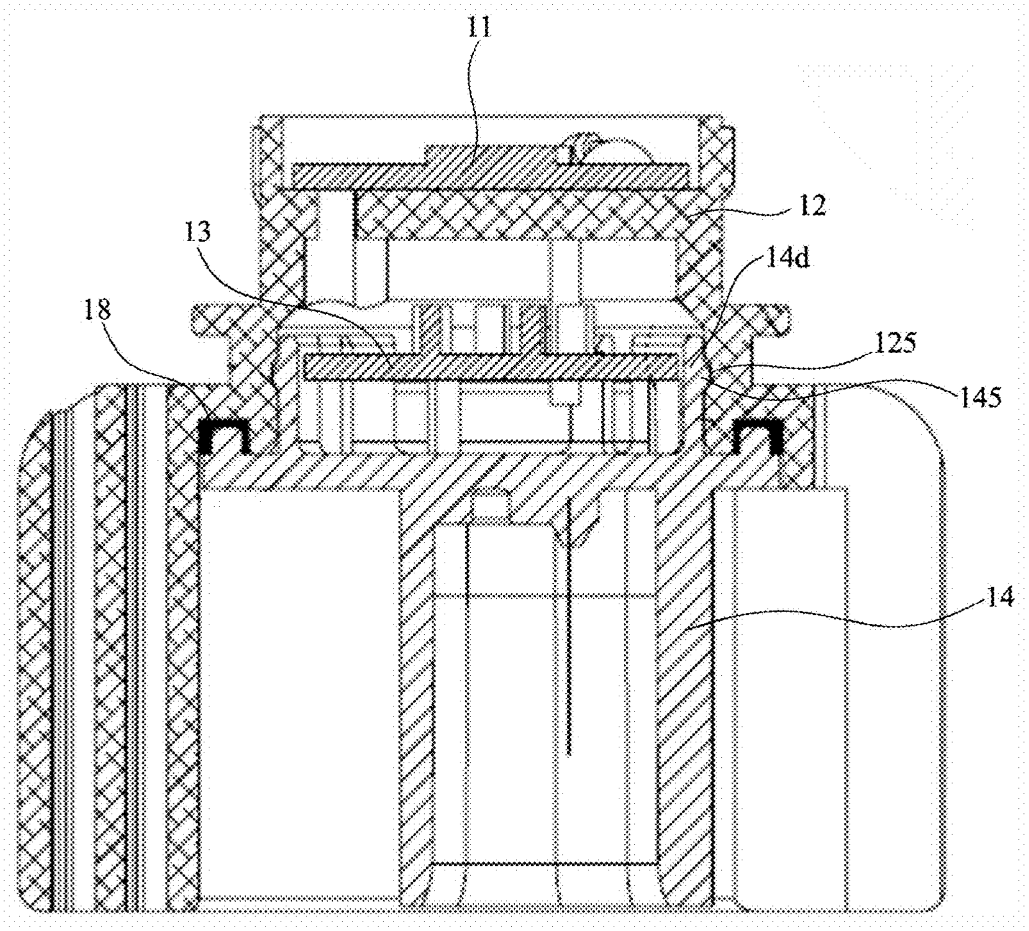

The connector 14 is fixedly attached to the heat sink 12. In the illustrated example, the connector 14 is fixedly attached to the heat sink 12 by a sealant 18. When the connector 14 and the light source 11 are attached to the heat sink 12, the light source 11 is spatially separated from the driver 12. Therefore, heat generated from the light source 11 is apart from heat generated from the driver 12, so that heat is not concentrated. Thermally conductive glue 19 may be filled around the driver 12 so that the heat generated by the driver 12 can be transferred to the heat sink 12 via the thermally conductive glue 19. As shown in FIGS. 4 and 5, the connector 14 may further include a positioning member 14*d*. The positioning member 14*d* extends in a circumferential direction and has a protrusion 145 on its outer circumferential surface. Accordingly, the heat sink 12 has a recess 125 for receiving the protrusion 145. After the connector 14 is assembled in position, the protrusion 145 is received in the recess 125, thereby positioning the connector 14.

It should be understood that a structure or a connection of the connector is not limited to the specific example shown, and instead may vary with actual needs.

Figure 6:
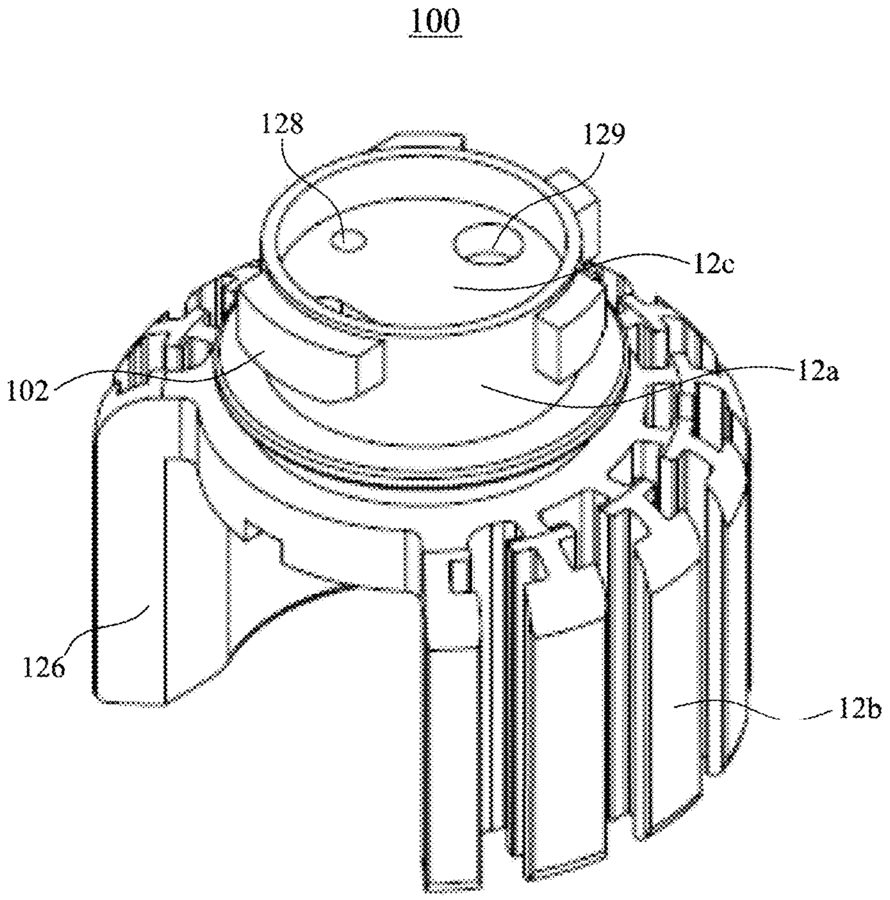
FIGS. 6 and 7 are schematic perspective views of a heat sink according to an embodiment of the present disclosure viewed from different directions.
Figure 7:
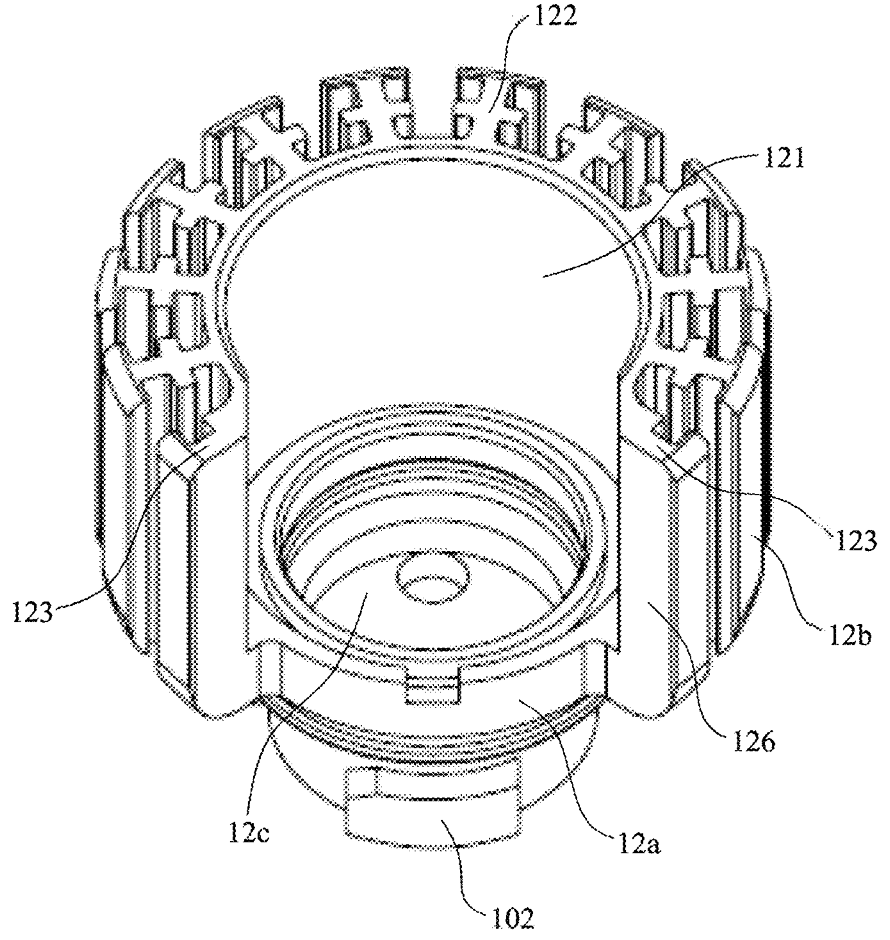
Figure 8:
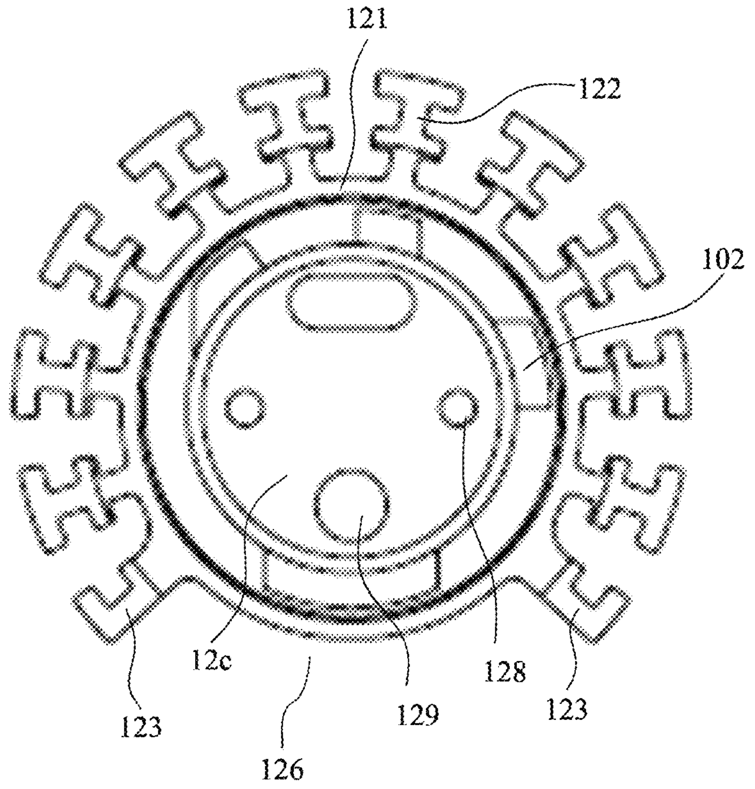
FIG. 8 is a top plan view of the heat sink shown in FIG. 6.

Hereinafter, the heat sink 100 according to an embodiment of the present disclosure will be described in detail with reference to FIGS. 6 to 8. As shown in FIGS. 6 to 8, the heat sink 100 is generally cylindrical with an internal space. The light source 11, the driver 13 and the connector 14 are located inside the internal space of the heat sink 100 such that the light source 11 and the driver 13 are radially surrounded by the heat sink 100. Such a structure is conducive to heat dissipation.

The heat sink 12 includes a base 12*a* and a heat dissipation structure 12*b*. The heat dissipation structure 12*b* extends from the base 12*a* in an axial direction. The heat dissipation structure 12*b* may also extend in a radial direction relative to the base 12*a*. That is, the heat dissipation structure 12*b* has a larger inner diameter than the base 12*a*, so as to increase an area for heat dissipation and facilitate accommodation of the connector 14. The base 12*a* is configured to mount the lamp 10 to a vehicle or any other suitable apparatus via a mounting feature 102. A sealing ring 17 is radially around the base 12*a* for sealing. The heat dissipation structure 12*b* is configured for heat dissipation. The base 12*a* and the heat dissipation structure 12*b* may be formed into one piece, as shown in the example. The heat sink 12 may be made of a metal material such as aluminum alloy or copper, or may be made of any other suitable material having high conductivity.

The base 12*a* is generally cylindrical. A supporter 12C is arranged inside the cylindrical base 12*a*. The supporter 12C divides a space inside the cylindrical base 12*a* into an upper space for accommodating the light source 11 and a lower space for accommodating the driver 13. That is, the light source 11 and the driver 13 are arranged on opposite sides of the supporter 12C in the axial direction. The light source 11 is attached to the supporter 12C. For example, the light source 11 is attached to the supporter 12C by the thermally conductive glue 16 as described above. The connector 14 is attached to an end of the base 12*a* so that the driver 13 is located between the connector 14 and the light source 11 and is spatially separated from the supporter 12C by a certain distance.

The supporter 12C is provided with at least one through hole 128. The pin 13*c* of the driver 13 passes through the through hole 128 and is electrically connected to the light source 11. The supporter 12C is further provided with an aperture 129 via which thermally conductive glue 19 is filled between the supporter 12C and the connector 14. It should be understood that the present disclosure is not limited to the specific examples shown herein. The through hole 128 may be communicated with the aperture 129, or shapes or numbers of the through hole 128 and the aperture 129 may vary based on actual needs.

The heat dissipation structure 12*b* is generally cylindrical. The heat dissipation structure 12*b* includes a cylindrical portion 121 and multiple fins 122. The cylindrical portion 121 extends from the base 12*a* in the axial direction. The multiple fins 122 each extend in the axial direction and the radial direction on an outer circumferential surface of the cylindrical portion 121. Preferably, the multiple fins 122 are evenly distributed in a circumferential direction of the cylindrical portion 121.

In the illustrated example, the cylindrical portion 121 does not extend 360 degrees in the circumferential direction, that is, the cylindrical portion 121 is provided with an opening 126. The opening 126 can promote air flow to improve efficiency of heat dissipation. In addition, the opening 126 may also provide space for other components. It should be understood that a size, a shape or the like of the opening 126 may vary with actual needs.

Each of the multiple fins 122 includes a radially extending portion and a laterally extending portion extending laterally from the radially extending portion. In the illustrated example, the fin 122 has a cross-section with a shape in which two "F"s are connected back to back to each other. In the case of the opening 126, a fin 123 at each side of the opening has an "F"-shaped cross-section.

It should be understood that a size, a shape, an inclination angle of each part of the fin 122, the number of the fins 122, and the like may vary with actual needs, and should not be limited to the specific example shown.

Figure 9:
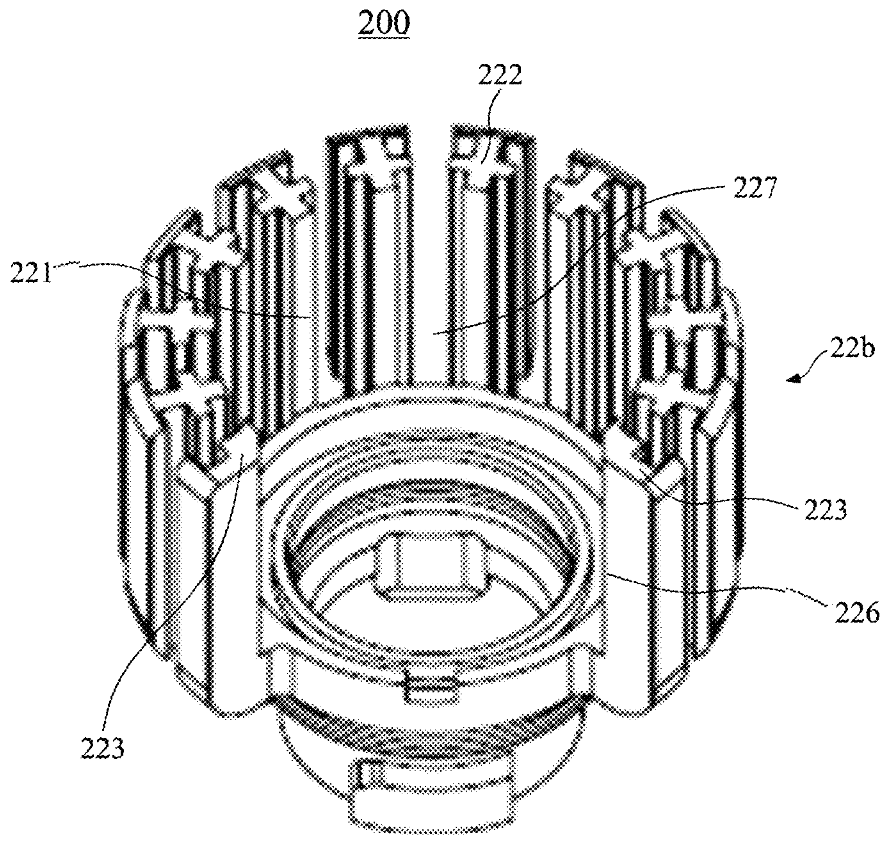
FIG. 9 is a schematic perspective view of a variant of the heat sink shown in FIGS. 6 to 8.

FIG. 9 is schematic perspective view of a variant of the heat sink shown in FIGS. 6 to 8. As shown in FIG. 9, a difference between a heat sink 200 and the heat sink 100 is that a heat dissipation structure 22*b* of the heat sink 200 further includes a slit 227. The slit 227 can promote air flow to improve the efficiency of heat dissipation. Structures of a fin 222, a fin 223 and an opening 226 of the heat dissipation structure 22*b* are the same as the structures of the fin 122, the fin 123 and the opening 126 of the heat dissipation structure 12*b*. In the example shown in FIG. 9, a cylindrical portion 221 has a slit 227 between adjacent fins 222. It should be understood that a size, a shape, the number and the like of the slit 227 may vary with actual needs, and should not be limited to the specific examples shown.

Figure 10:
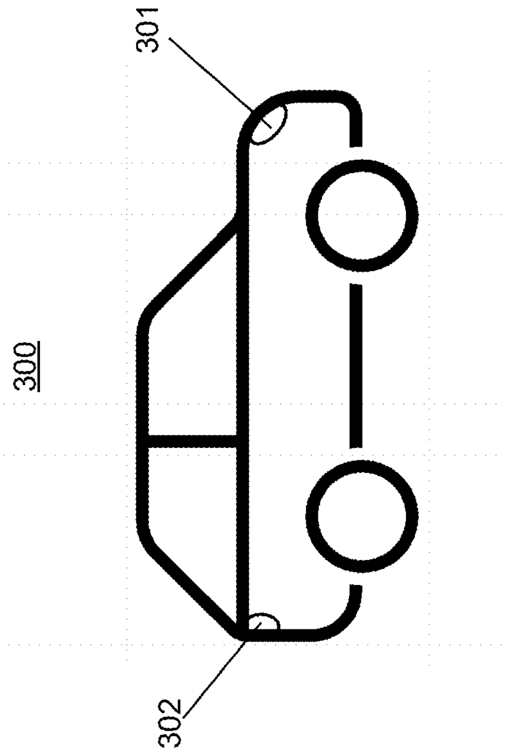
FIG. 10 shows a vehicle with a headlight and a taillight.

FIG. 10 shows a vehicle 300 with a headlight 301 and a taillight 302.

Although the present disclosure has been described with reference to the exemplary embodiments, it should be understood that the present disclosure is not limited to the specific embodiments described and illustrated herein. Those skilled in the art can make various changes to the exemplary embodiments without departing from the scope defined by the claims. It should further be understood that, provided that the technical solutions are not contradictory, the features of the various embodiments may be combined with each other or may be omitted.

The invention claimed is:

1. A lamp comprising:

a light source comprising a light source circuit board and a light emitting element arranged on the light source circuit board;

a driver configured to drive the light source and comprising a driving circuit board and a driving electronic element arranged on the driving circuit board;

a connector connectable to a power source, wherein the driver is connected to the connector such as to be spatially separated from the light source; and a heat sink inside which the light source and the connector are fixedly attached such that the light source and the driver are radially surrounded by the heat sink, wherein the connector comprises:

a supporting column supporting the driving circuit board, and a retainer holding the driving circuit board on the supporting column.

2. The lamp according to claim 1, wherein the driver is located between the connector and the light source.

3. The lamp according to claim 2,
wherein the heat sink comprises a base and a heat dissipation structure extending from the base in an axial direction,
wherein the base comprises a support to which the light source is attached; and
wherein the light source and the driver are arranged on opposite sides of the support in the axial direction.

4. The lamp according to claim 3, wherein the support comprises at least one through hole via which the driver is electrically connected to the light source.

5. The lamp according to claim 3,
wherein the light source is attached to the support by thermally conductive glue; and
wherein the support comprises an aperture via which the thermally conductive glue is filled between the support and the connector.

6. The lamp according to claim 3, wherein the heat dissipation structure comprises:
a cylindrical portion extending from the base in the axial direction, and
a plurality of fins extending in the axial direction on an outer circumferential surface of the cylindrical portion and evenly distributed in a circumferential direction of the cylindrical portion.

7. The lamp according to claim 6,
wherein the cylindrical portion of the heat sink comprises an opening,
wherein a fin at each side of the opening has "F"-shaped cross-section, and
wherein other fins than the fin at each side of the opening have a cross-section with a shape in which two "F"s are connected back to back to each other.

8. The lamp according to claim 3, wherein the base and the heat dissipation structure of the heat sink are formed in one piece.

9. The lamp according to claim 2, wherein the connector is fixedly attached to the heat sink by a sealant.

10. The lamp according to claim 2,
wherein the connector comprises a positioning member having a protrusion, and
wherein the heat sink is provided with a recess for receiving the protrusion.

11. The lamp according to claim 1, wherein the retainer comprises a hook configured to retain the driving circuit board.

12. The lamp according to claim 1, wherein the lamp is a headlight or a taillight for a vehicle.

* * * * *